United States Patent
Cho et al.

(10) Patent No.: US 12,024,061 B2
(45) Date of Patent: Jul. 2, 2024

(54) VEHICLE EQUIPPED WITH ELECTRIC MOTOR AND METHOD OF CONTROLLING TRAVELING OF SAME

(71) Applicants: Hyundai Motor Company, Seoul (KR); Kia Corporation, Seoul (KR)

(72) Inventors: Jin Kyeom Cho, Suwon-si (KR); Seong Wook Moon, Seoul (KR); Myung Woo Kim, Hwaseong-si (KR); Joon Young Park, Seoul (KR); Sung Deok Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 312 days.

(21) Appl. No.: 17/555,910

(22) Filed: Dec. 20, 2021

(65) Prior Publication Data
US 2022/0379731 A1    Dec. 1, 2022

(30) Foreign Application Priority Data
May 25, 2021    (KR) .................. 10-2021-0066734

(51) Int. Cl.
*B60L 7/18*    (2006.01)
*B60L 15/20*    (2006.01)
(Continued)

(52) U.S. Cl.
CPC ............. *B60L 7/18* (2013.01); *B60L 15/2009* (2013.01); *B60L 15/2063* (2013.01);
(Continued)

(58) Field of Classification Search
CPC .... B60L 7/18; B60L 15/2009; B60L 15/2063; B60W 10/08; B60W 30/18072;
(Continued)

(56) References Cited

U.S. PATENT DOCUMENTS 8,567,547 B2 *  10/2013  Kulatunga .............. B60L 50/66
                                                                   180/212
8,612,074 B2 *  12/2013  Minarcin ............... B60W 10/08
                                                                   701/22

(Continued)

FOREIGN PATENT DOCUMENTS

CA      3098511 A1 *  1/2020  .......... B60L 15/2009
CN    114715121 A  *  7/2022  ................ B60L 7/18
(Continued)

*Primary Examiner* — Atul Trivedi
(74) *Attorney, Agent, or Firm* — SLATER MATSIL, LLP

(57) ABSTRACT

An embodiment method of controlling traveling of an electrified vehicle equipped with an electric motor as a power source includes determining whether it is possible to enter a variable control function. The variable control function includes a function of variably controlling a coasting torque level using a regenerative braking force. In response to a determination that it is not possible to enter the variable control function, a cause of an inability to enter the variable control function is determined and control is performed in a manner that corresponds to a determination that it is possible to enter the variable control function or the determination of the cause of the inability to enter the variable control function in response to the determination that it is not possible to enter the variable control function.

15 Claims, 5 Drawing Sheets

(51) Int. Cl.
  *B60W 10/08*    (2006.01)
  *B60W 30/18*    (2012.01)
(52) U.S. Cl.
  CPC ...... *B60W 10/08* (2013.01); *B60W 30/18072* (2013.01); *B60W 30/18127* (2013.01); *B60W 2510/087* (2013.01); *B60W 2510/244* (2013.01); *B60W 2556/50* (2020.02); *B60W 2710/083* (2013.01)
(58) Field of Classification Search
  CPC ....... B60W 30/18127; B60W 2556/50; B60W 2510/087; B60W 2510/244; B60W 2710/083
  USPC .......................................................... 701/22
  See application file for complete search history.

(56) References Cited

U.S. PATENT DOCUMENTS

| | | | | |
|---|---|---|---|---|
| 10,723,229 | B1* | 7/2020 | Yao | B60L 7/10 |
| 2004/0207350 | A1* | 10/2004 | Wilton | B60L 3/102 |
| | | | | 318/376 |
| 2005/0151420 | A1* | 7/2005 | Crombez | B60K 6/44 |
| | | | | 903/947 |
| 2008/0224478 | A1* | 9/2008 | Tamor | B60W 20/10 |
| | | | | 477/3 |
| 2014/0358340 | A1* | 12/2014 | Radev | B60W 10/26 |
| | | | | 180/65.265 |
| 2016/0031325 | A1* | 2/2016 | Kim | B60K 6/48 |
| | | | | 701/70 |
| 2016/0059705 | A1* | 3/2016 | Kim | B60T 8/1701 |
| | | | | 701/22 |
| 2018/0372200 | A1* | 12/2018 | Kumar | B60K 6/442 |
| 2019/0126759 | A1* | 5/2019 | Miller | B60L 15/2009 |
| 2019/0143821 | A1* | 5/2019 | Bell | B60W 10/08 |
| | | | | 180/65.225 |
| 2019/0176827 | A1 | 6/2019 | Han et al. | |
| 2019/0207180 | A1* | 7/2019 | Richter | B60W 10/08 |
| 2019/0270383 | A1* | 9/2019 | Murakami | B60L 50/16 |
| 2019/0337391 | A1* | 11/2019 | Crombez | B60W 30/18127 |
| 2019/0344778 | A1 | 11/2019 | Han et al. | |
| 2020/0086849 | A1* | 3/2020 | Colavincenzo | B60L 1/02 |
| 2020/0307384 | A1* | 10/2020 | Mendez Pineda | B60L 58/12 |
| 2020/0361441 | A1* | 11/2020 | Ruybal | B60W 10/08 |
| 2021/0031746 | A1* | 2/2021 | Tabata | B60W 20/40 |
| 2021/0086623 | A1* | 3/2021 | Yao | B60W 30/18172 |
| 2021/0086736 | A1* | 3/2021 | Yao | B60T 1/10 |
| 2021/0221343 | A1* | 7/2021 | Yao | B60T 8/174 |
| 2022/0097676 | A1* | 3/2022 | Gesang | B60W 20/14 |
| 2022/0195955 | A1* | 6/2022 | Sugimoto | B60W 10/04 |
| 2022/0212542 | A1* | 7/2022 | Ortmann | B60T 8/321 |
| 2022/0379731 | A1* | 12/2022 | Cho | B60W 30/18072 |
| 2023/0116610 | A1* | 4/2023 | Woo | B60L 58/12 |
| | | | | 701/22 |
| 2023/0226922 | A1* | 7/2023 | Modak | B60L 58/12 |
| | | | | 701/22 |
| 2023/0396090 | A1* | 12/2023 | Kang | H02J 7/0048 |

FOREIGN PATENT DOCUMENTS

| | | | | |
|---|---|---|---|---|
| DE | 102013219691 B4 * | 5/2021 | ............ | B60K 6/445 |
| EP | 3375656 B1 * | 2/2023 | ............ | B60L 15/20 |
| GB | 2594289 A * | 10/2021 | ............ | B60K 6/448 |
| KR | 20190068285 A | 6/2019 | | |
| KR | 20190128853 A | 11/2019 | | |

* cited by examiner

VEHICLE EQUIPPED WITH ELECTRIC MOTOR AND METHOD OF CONTROLLING TRAVELING OF SAME

CROSS-REFERENCE TO RELATED APPLICATIONS

This application claims the benefit of Korean Patent Application No. 10-2021-0066734, filed on May 25, 2021, which application is hereby incorporated herein by reference.

TECHNICAL FIELD

The present invention relates to a vehicle with an electric motor and a method of controlling the traveling of the same.

BACKGROUND

In the dictionary sense, a coasting operation means running a vehicle using the accelerated kinetic energy reserve stored in the vehicle mass without outputting a drive force. Generally, the coasting operation means a vehicle traveling in a state where an accelerator pedal (APS) and a brake pedal (BPS) are not operated.

Torque exerted on a drive shaft during the coasting operation is referred to as coasting torque. In a general-type vehicle with an internal combustion engine, idle torque of the engine is also transferred to a drive shaft by a torque converter and a transmission in a state where a pedal operation is not operated. This torque is referred to as creep torque.

During the coasting operation, this creep torque is transferred to the drive shaft by the engine, and traveling load due to a vehicle speed is exerted in a direction opposite to a direction of the creep torque. The sum of the creep torque and the traveling torque constitutes the coasting torque. The coasting torque is described with reference to FIG. 1.

FIG. 1 is a graph illustrating an example of a relationship between the coasting torque and the vehicle speed in a case where the coasting operation is performed in a general-type vehicle.

With reference to FIG. 1, in a case where the vehicle speed is low, the transmission is generally in a low gear. Thus, in a case where a speed at an input gear of the transmission is lower than the RPM of an engine at idle, idle torque of the engine is transferred, and thus the vehicle travels with the creep torque. In contrast, at a high vehicle speed, the transmission is in relatively high gear, and thus the speed at the input gear of the transmission is higher than the RPM of the engine at idle. In this case, drag due to cut-off of fuel supply (fuel cut) to the engine is transferred, and thus the coasting torque occurs.

Due to an increasing environmental concern, electrified vehicles, such as hybrid electric vehicles (HEVs) or electric vehicles (EVs), that use an electric motor as a drive source therefor, have been under development.

The electrified vehicle is not equipped with an engine, or an engine of the electrified vehicle is not always in operation. Thus, the creep torque due to the engine does not occur. However, normally, control that produces the creep torque by driving a motor is performed in order to realize characteristics of a general-type internal combustion engine. Therefore, in a vehicle equipped with an electric motor, as illustrated in FIG. 1, in a low-speed situation, torque in the positive direction due to a drive force of the internal combustion engine at idle and an effect of torque multiplication by a torque converter is imitated. Furthermore, in a high-speed situation, torque in the opposite direction due to drag by the engine, fuel supply to which is cut off, is imitated. A section in which the torque in the positive direction is imitated is referred to as a creep section, and a section in which the torque in the opposite direction is imitated is referred to as a coasting segment. In this case, the torque in the opposite direction may be realized as regenerative braking.

In the electrified vehicle, during braking, a motor is operated as a generator together with a hydraulic pressure friction brake. Accordingly, kinetic energy of the vehicle is converted into electric energy, and thus braking results. This type of braking is referred to as regenerative braking.

In the electrified vehicle, through a device (for example, a paddle shift lever) that is capable of adjusting an amount of regenerative braking, the amount of regenerative braking, that is, a coasting level is variably changed. Thus, a function of enjoying driving and improving fuel efficiency on an actual road is provided. This function is described with reference to FIG. 2.

FIG. 2 is a graph illustrating the concept of a general-type coasting level.

With reference to FIG. 2, a relationship between a vehicle speed illustrated in FIG. 1 and the total torque exerted on a vehicle shaft is illustrated for each of the five different examples of coasting torque. Specifically, each time the negative sign ("−") side of the paddle shift lever is pulled, the amount of regenerative braking increases level by level, and thus vehicle deceleration increases. Each time the positive sign ("+") thereof is pulled, the amount of regenerative braking decreases level by level, and thus the vehicle deceleration decreases. Therefore, in the vehicle, the higher a coasting level and the lower the vehicle speed, the more rapid deceleration occurs due to the regenerative braking.

However, in the electrified vehicle, in a case where a battery or a motor is at a high temperature due to traveling at a high speed or traveling under high load or where a state of charge (SOC) of the battery is at or above a predetermined value, the regenerative braking is not possible. Thus, a driver, although he/she desires to perform a coasting level control function, cannot enter the coasting level control function.

SUMMARY

The present invention relates to a vehicle with an electric motor and a method of controlling the traveling of the same. Particular embodiments relate to an electrified vehicle capable of expanding a range of possibilities of performing a function of controlling a regenerative braking level, and a method of controlling traveling of the electrified vehicle.

An embodiment of the present invention provides an electrified vehicle capable of expanding a range of possibilities of entering a coasting level control function, and a method of controlling traveling of the electrified vehicle.

Another embodiment of the present invention is to provide an electrified vehicle capable of setting up a condition for entering a coasting level control function in a case where there is a possibility that a driver will perform the coasting level control function and a method of controlling traveling of the electrified vehicle.

The present invention is not limited to the above-mentioned technical embodiments. From the following description, other technical embodiments would be understood by a person of ordinary skill in the art to which the present invention pertains.

According to an embodiment of the present invention, there is provided a method of controlling traveling of an electrified vehicle equipped with an electric motor as a power source therefor, the method including determining a possibility of entering a variable control function and a cause of an inability to enter the variable control function in a case where a function of variably controlling a coasting torque level using a regenerative braking force is not enterable, and performing control that addresses the cause of the inability to enter the variable control function in a manner that corresponds to the possibility of entering the variable control function and the cause of the inability to enter the variable control function.

According to another embodiment of the present invention, there is provided an electrified vehicle including an electric motor and a control unit, wherein the control unit includes a determination unit determining a possibility of entering a variable control function and a cause of an inability to enter the variable control function in a case where a function of variably controlling a coasting torque level using a regenerative braking force is not enterable, and a controller performing control that addresses the cause of the inability to enter the variable control function in a manner that corresponds to the possibility of entering the variable control function and the cause of the inability to enter the variable control function.

The electrified vehicle configured as described above according to at least one of the embodiments of the present invention can expand the range of possibilities of entering the coasting level control function.

Particularly, the range of possibilities of entering the coasting level control function can be expanded by predicting a possibility that a driver will perform the coasting level control function and then by taking action to address the cause of the inability to enter the coasting level control function.

The embodiments of the present invention are not limited to the embodiments described above. From the following description, other embodiments would be apparent to a person of ordinary skill in the art to which the present invention pertains.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

Figure 1:
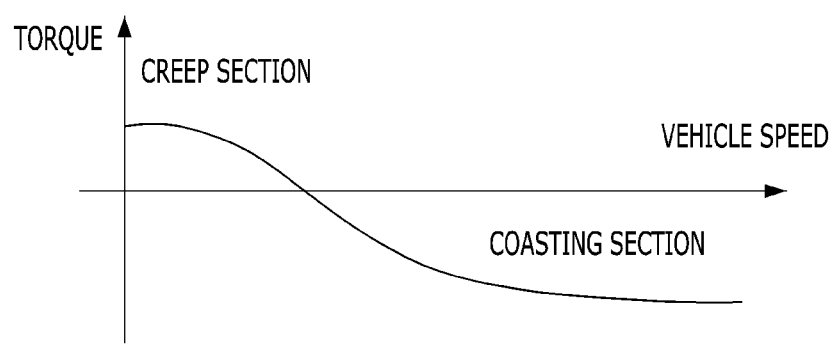
FIG. 1 is a graph illustrating an example of a relationship between coasting torque and a vehicle speed in a case where a coasting operation is performed in a general-type vehicle.
Figure 2:
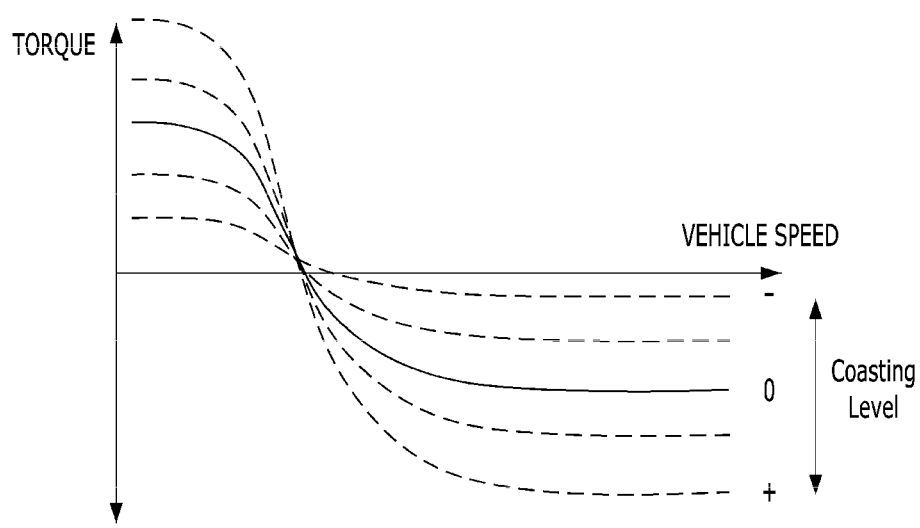
FIG. 2 is a graph illustrating the concept of a general-type coasting level.

Embodiments of the present invention will be described in detail below with reference to the accompanying drawings in such a manner that a person of ordinary skill in the art to which the present invention pertains is enabled to practice them without undue experimentation. The present invention may be embodied in various different forms and is not limited to the embodiments described below. An illustration unnecessary in definitely describing the present invention is omitted from the drawings, and a like constituent element has a like reference numeral throughout the specification.

Unless otherwise described, the expression "includes a constituent element," when used throughout the specification, means that any other constituent element may further be included, not that any other constituent element is excluded. In addition, constituent elements that are given the same reference numeral throughout the specification are the same.

According to an embodiment of the present invention, when a function of variably controlling a coasting torque level using a variable amount of regenerative braking according to a vehicle speed through operation of a predetermined device in a vehicle is not enterable, a driver can expand a range of possibilities of entering the function by taking action to address a cause of an inability to enter the function in terms of the possibility of performing the function.

For convenience of description, the predetermined device in the vehicle for setting the coasting torque level is hereinafter assumed as a paddle shift lever that is selected for illustrative purpose, but is not necessarily limited thereto. It would be apparent to a person of ordinary skill in the art that one of various forms of an operation device, such as a dial, a key button, and a switch may be used instead of the paddle shift lever. In addition, for convenience, the function of controlling the coasting torque level that is mentioned above is referred to as a "coasting-level variable control function," or "paddle regenerative braking" on the assumption that the paddle shift lever is used for control of the function of controlling the coasting torque level. In addition, electrified vehicles in which the embodiments of the present invention find application may include a hybrid electric vehicle (HEV), an electric vehicle (EV), and a fuel cell electric vehicle (FCEV). The embodiments of the present invention may find application in any type of electric vehicle that is capable of using a motor as a drive source therefor and controlling regenerative braking torque.

Figure 3:
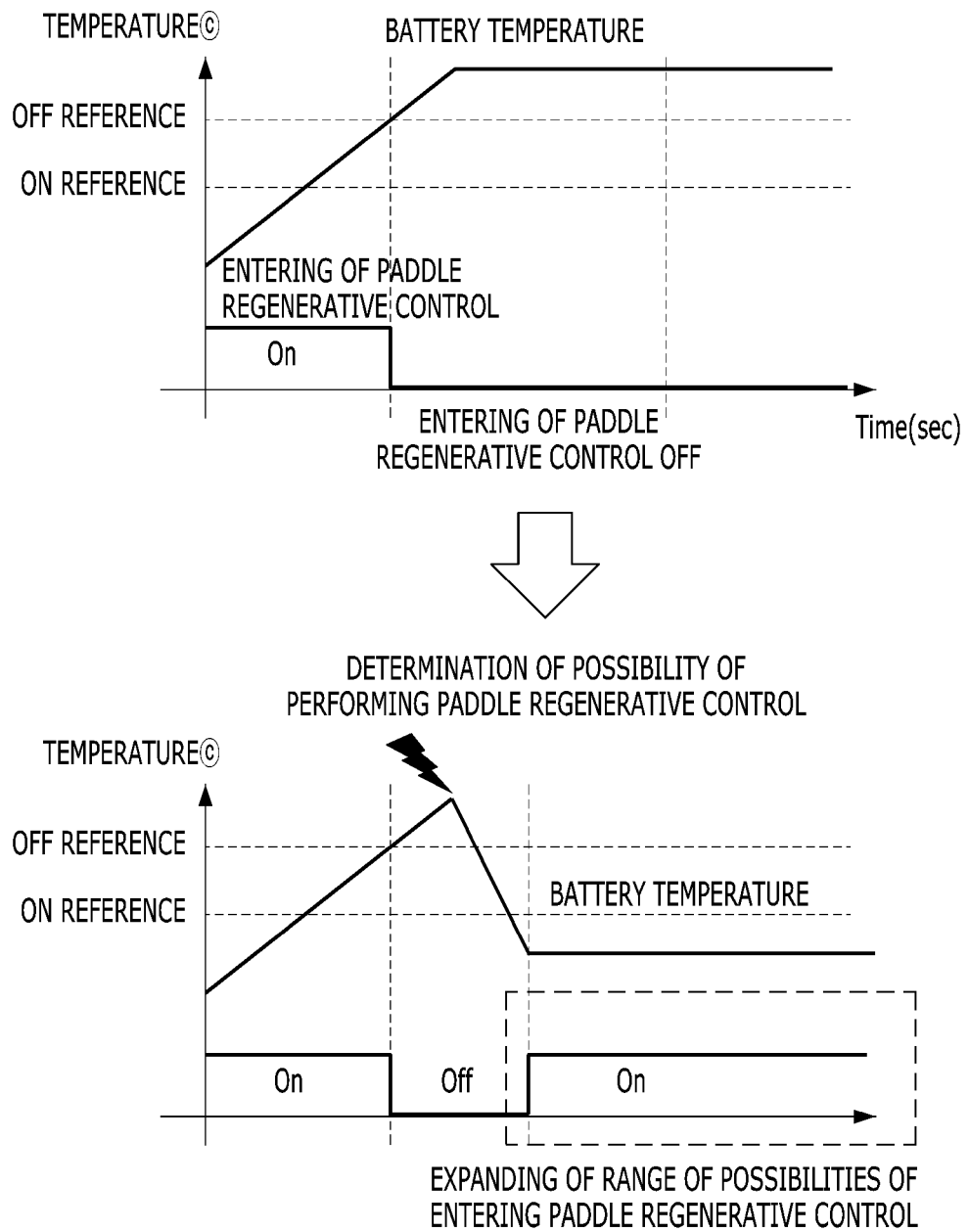
FIG. 3 are graphs illustrating the concept of control according to an embodiment of the present invention.

FIG. 3 provides graphs illustrating the concept of control according to an embodiment of the present invention.

The graph on the upper portion of FIG. 3 illustrates a problem occurring during general paddle regenerative control. The graph on the lower portion of FIG. 3 illustrates the concept of control for expanding a range of possibilities of entering paddle regenerative control according to an embodiment of the present invention. The horizontal axis of each of the two graphs in FIG. 3 represents time, and the vertical axis of each of the two graphs represents battery temperature. However, the vertical axis may represent motor temperature or an SOC of a battery instead of the battery temperature.

First, with reference to the graph on the upper portion of FIG. 3, in a case where the battery temperature falls at or below an ON reference, with operation of the paddle shift lever by the driver, it is possible to enter the paddle regenerative control. Subsequently, when the battery temperature rises up to an OFF reference by vehicle traveling or regenerative braking that uses a motor, the paddle regenerative control is turned off. A general-type electrified vehicle does not perform a separate battery cooling operation. Thus, although the driver attempts again later to operate the paddle shift lever, the paddle regenerative control cannot be entered.

According to embodiments of the present invention, when the paddle regenerative control is not enterable, such as when the battery temperature rises up to the OFF reference as illustrated in the graph on the lower portion of FIG. 3, it is determined whether or not there is the possibility of performing the paddle regenerative control. When the result of the determination satisfies a preset condition, the battery temperature is caused to fall at or below the ON reference by performing active battery cooling control. Thus, when the driver makes a request for the paddle regenerative control, the paddle regenerative control can be immediately entered. Accordingly, the range of possibilities of entering the paddle regenerative control can be expanded.

Figure 4:
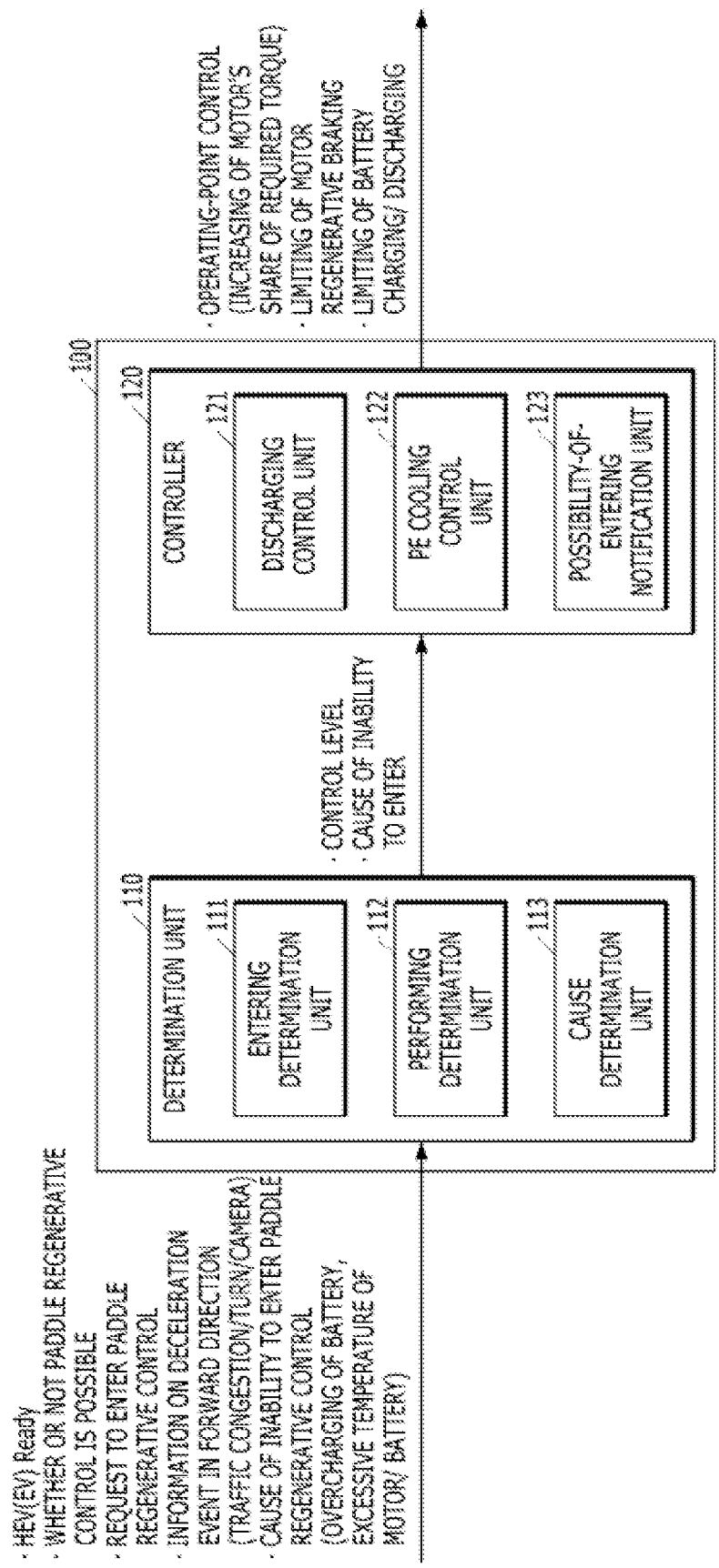
FIG. 4 is a diagram illustrating an example of a configuration of a controller according to an embodiment of the present invention.

FIG. 4 is a diagram illustrating an example of a configuration of a controller according to an embodiment of the present invention.

With reference to FIG. 4, a control unit 100 for performing control that expands the range of possibilities of entering the paddle regenerative control according to an embodiment of the present invention may include a determination unit no and a controller 120.

In addition, pieces of information that are input into the control unit 100 may include information on whether or not a vehicle is ready for traveling (HEV Ready, EV Ready, and the like that correspond to ignition (IG) On in a vehicle with an internal combustion engine), information on whether or not the paddle regenerative control is possible, a request made to enter the paddle regenerative control, information on a deceleration event (traffic congestion, a turn lane, an unmanned camera, and the like) in the forward direction, a cause of the inability to enter the paddle regenerative control, and the like. Among these, the inability to enter the paddle regenerative control may be caused by, for example, a battery overcharging, excessive temperature of a motor or battery, and the like, but is not necessarily limited thereto.

In addition, pieces of information that are output by the control unit 100 may include information for operating-point control, information for limiting regenerative braking that uses a motor, information for charging and discharging a battery, and the like.

The control unit 100 of the electric vehicle (EV) may be realized as, for example, one function of a vehicle control unit (VCU), but is not necessarily limited thereto. The control unit 100 of the hybrid electric vehicle (HEV) may be realized as, for example, a hybrid control unit (HCU), but is not necessarily limited thereto. As another implementation example, the control unit 100 may be a control unit that is provided separately from the VCU or the HCU.

Regarding a source for input information, the information on whether or not a vehicle is ready for traveling, the information on whether or not the paddle regenerative control is possible, and the like may be determined/retained by the HCU itself, and the information on the deceleration event in the forward direction may be acquired from a navigation system. In addition, the cause of the inability to enter the paddle regenerative control may be acquired from a battery control unit (for example, a battery management system (BMS)) and a motor control unit (MCU).

In addition, various pieces of output information may be transferred to a high-level control unit, for example, to the HCU or the VCU, which controls a power train.

The term control unit that is included in each of the terms motor control unit (MCU) and hybrid control unit (HCU) is widely used only to refer to a controller controlling a specific function of a vehicle and therefore does not mean a generic function unit. For example, each control unit may include a communication interface device, a memory, and one or more processors in order to perform the function control assigned thereto. The communication interface communicates with another control unit, e.g., a sensor. An operating system, a logic command language, input information, output information, and the like are stored in the memory. The one or more processors perform determination, computation, decision-making, and the like that are necessary for the function control.

Respective functions of the determination unit 110 and the controller 120 will be described below.

The determination unit 110 may include an entering determination unit 111, a performing determination unit 112, and a cause determination unit 113.

The entering determination unit 111 determines whether or not the paddle regenerative control is enterable. More specifically, in most cases, in the electrified vehicle, the paddle regenerative control may not be enterable in a battery-overcharged state or at an excessive temperature situation. In the battery-overcharged state, a high-voltage battery cannot be further charged through the paddle regenerative control. The excessive temperature situation occurs when at least one of a motor, a battery, and an inverter rises up to a predetermined temperature value or higher because a power train electric (PE) component of the electrified vehicle is excessively used due to high-speed/high-load traveling.

Using a plurality of control levels, the performing determination unit 112 may determine the final possibility of performing the paddle regenerative control. The plurality of control levels are the sum of levels to which a control level is set. The control level is raised level by level for each event associated with the possibility of entering the paddle regenerative control. For example, in a case where there are two events associated with the possibility of entering the paddle regenerative control, the possibility of entering the paddle regenerative control may be determined as being set to Level 0, Level 1, or Level 2. Specifically, in a case where the driver attempts to enter the paddle regenerative control by operating the paddle shift lever, but the paddle regenerative control is not enterable, there is a high probability that the driver will reattempt to enter the paddle regenerative control within a short time. In this case, the performing determination unit 112 raises the control level by one level. In addition, in a case where through navigation traffic information, the driver is alerted that the traffic congestion or the deceleration event (a turn, a camera, an IC, and the like) occurs in the forward direction, there is a high probability that the driver will reattempt to enter the paddle regenerative control. In this case, the performing determination unit 112 also may raise the control level by one level.

The cause determination unit 113 may determine whether the inability to enter the paddle regenerative control is caused by the battery overcharging or by the excessive temperature of the PE component, such as the battery, the inverter, or the motor.

The determination unit no may transmit to the controller 120 the level at which the paddle regenerative control is entered, which is determined by the performing determination unit 112 and the cause of the inability to enter the paddle regenerative control, which is determined by the cause determination unit 113.

The controller 120 may include a discharging control unit 121, a PE cooling control unit 122, and a possibility-of-entering notification unit 123.

In a case where the inability to trigger the paddle regenerative control is caused both by the battery overcharging and by the excessive temperature of the PC component, the controller 120 may first perform cooling control of the battery, the inverter, the motor, or the like through the PE cooling control unit 122, and then may perform SOC discharging control through the discharging control unit 121. The reason for this is because the PC component needs to be cooled before being used for discharging control.

In a case where the inability to enter the paddle regenerative control is caused by the battery overcharging, the discharging control unit 121 may perform the SOC discharging control. For example, in a (P) HEV, in a case where the control level is Level 1, a low SOC is attained by performing the operating-point control that increases output torque of the motor in a manner that is higher than output torque of an engine when producing torque required by the driver. In addition, in a case where the control level is Level 2, as a method of limiting an amount of regenerative braking that is produced by the motor during braking, a high SOC is suppressed from being attained by preventing additional charging of the battery.

In a case where the inability to enter the paddle regenerative control is caused by the excessive temperature of the battery, the inverter, the motor, or the like, the PE cooling control unit 122 performs the cooling control of the PE component. For example, in the case where the control level is Level 1, control that limits the charging/discharging of the battery is performed in such a manner that the temperature of the PE component is decreased. In addition, in the case where the control level is level 2, the amount of regenerative braking that is produced by the motor during braking is limited, and thus the temperature of the PE component is prevented from being additionally increased due to the charging by the motor.

When a state where the paddle regenerative control is enterable is attained through the discharging control by the discharging control unit 121 or through the cooling control by the PE cooling control unit 122, the notification unit 123 may control a predetermined output unit in order to notify the driver that a change takes place in such a manner that the paddle regenerative control is enterable. This notification is described with reference to FIG. 5.

Figure 5:
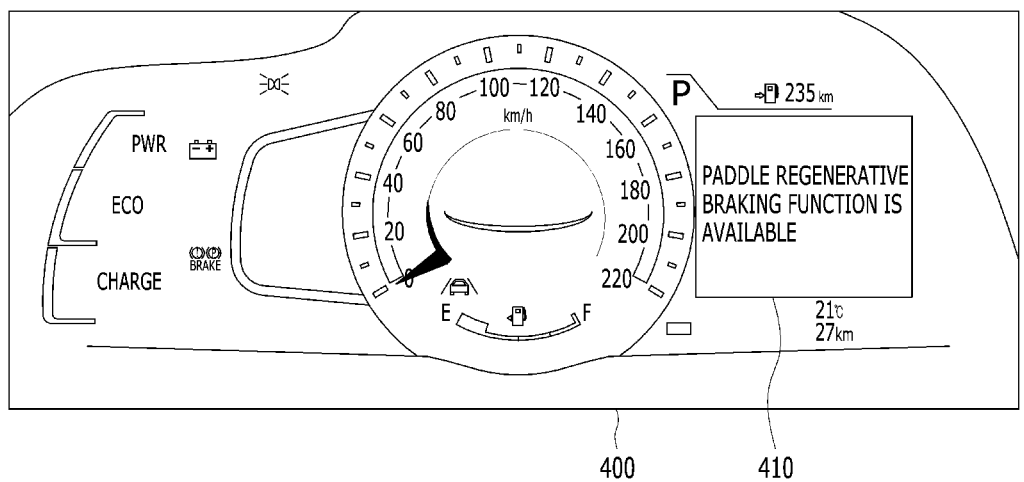
FIG. 5 is a view illustrating an example of a type of notification of information indicating that a function is enterable according to an embodiment of the present invention.

FIG. 5 is a view illustrating an example of a type of notification of information indicating that a function is enterable according to an embodiment of the present invention.

With reference to FIG. 5, the information that the change takes place in such a manner that the paddle regenerative control is enterable may be output on a display area 410 of a cluster 400, on which graphic display is possible. However, the graphic display here is provided for illustrative purposes, and therefore the notification information may be output in the form of a warning light instead of the graphic display. In addition, of course, the notification information that is displayed on the display area 410 of the cluster 400 may be displayed on a head-up display (HUD) or a display of a head unit as a predetermined output unit.

Figure 6:
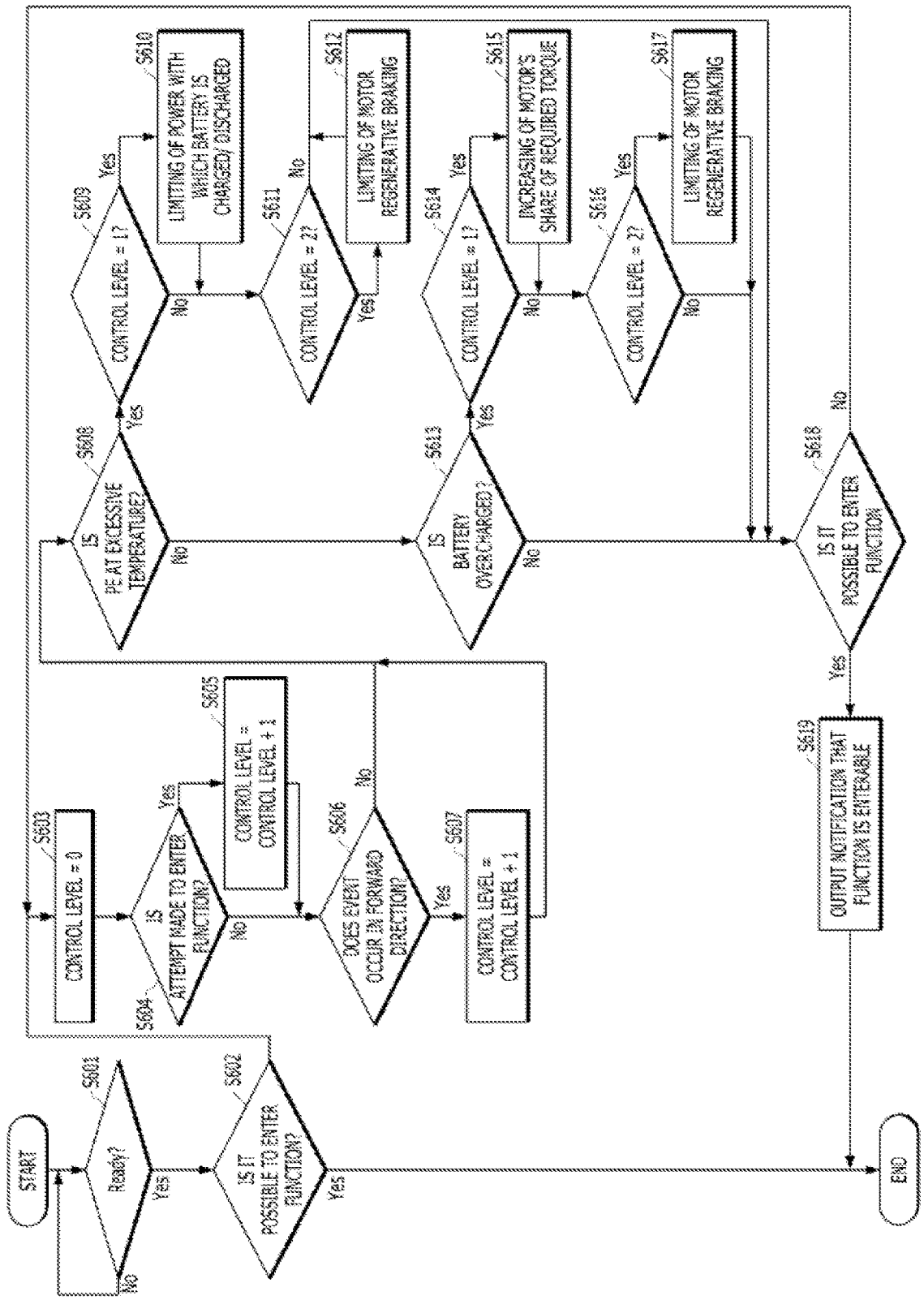
FIG. 6 is a flowchart illustrating an example of a vehicle-traveling control process according to an embodiment of the present invention.

The control method described so far is summarized in the form of a flowchart in FIG. 6.

FIG. 6 is a flowchart illustrating an example of a vehicle-traveling control process according to an embodiment of the present invention. In FIG. 6, for convenience, a paddle regenerative control function is referred to as a "function" for short.

With reference to FIG. 6, in a case where a state where the vehicle traveling is possible is attained (Yes in S601), the entering determination unit 111 determines whether or not the paddle regenerative control function is enterable (S602). When it is determined that the paddle regenerative control function is enterable (Yes in S602), the paddle regenerative control function is activated. When it is determined that the paddle regenerative control function is not enterable (No in S602), the determination unit 112 determines the control level.

Specifically, an initial control level is Level 0 (S603). In a case where the driver attempts to enter the paddle regenerative control function by operating an operation unit, such as the paddle shift lever (Yes in S604), the control level is raised by one level (S605).

In addition, in a case where the deceleration event occurs a predetermined distance or less away in the forward direction (Yes in S606), the control level may be raised by one level (S607).

For example, in a case where the deceleration event does not occur in the forward direction but the driver attempts to enter the paddle regenerative control function, the control level is Level 1. In a case where the deceleration event occurs in the forward direction in a state where the driver does not attempt to enter the paddle regenerative control function, the control level is also Level 1. In a case where the driver attempts to enter the paddle regenerative control function and where the deceleration event also occurs in the forward direction, the control level is Level 2. Of course, in a case where the deceleration event does not occur and where the driver does not attempt to enter the paddle regenerative control, the control level is Level 0. In a case where the control level is set to "0," the controller 120 may perform neither the discharging control nor the cooling control of the PE component.

The cause determination unit 113 may determine the cause of the inability to enter the paddle regenerative control. In a case where it is determined that the inability to enter the paddle regenerative control is caused by the excessive temperature of the PE component (Yes in S608), the cause determination unit 113 may perform the cooling control of the PE component that corresponds to the control level. For example, in a case where the control level is Level 1 (Yes in S609), the PE cooling control unit 122 may limit power with which the battery is charged/discharged (S610). In a case where the control level is Level 2 (Yes in S611), the PE cooling control unit 122 may limit the regenerative braking by the motor (S612). According to another embodiment of the present invention, Step S609 may be changed to "Is the control level Level 1 or higher?" In this case, when the control level is Level 2, both the battery charging/discharging and the regenerative braking by the motor may be limited together.

In addition, in a case where it is determined by the cause determination unit 113 that the inability to enter the paddle regenerative control is caused by the battery overcharging (S613), the discharging control that corresponds to the control level may be performed. For example, in a case where the control level is Level 1 (Yes in S614) and where the electrified vehicle is the (P)HEV, the discharging control unit 121 may perform control in such a manner that the motor's share of the required torque is increased (S615). In the case where the control level is Level 2 (Yes in S616), the discharging control unit 121 may limit the regenerative braking by the motor (S617). According to another embodiment of the present invention, Step S614 may be changed to "Is the control level Level 1 or higher?" In this case, when the control level is Level 2, the motor's share of the required torque may be increased, and at the same time, the regenerative braking by the motor may be limited. In addition, in a case where the electrified vehicle does not have a drive source other than the electric motor (in a case where the electrified vehicle is, for example, an EV), Step S614 and Step S615 may be omitted.

Subsequently, in a case where the causes of the inability to enter the paddle regenerative control are all addressed by the PE cooling control or the discharging control (Yes in S618), through a predetermined output unit, the notification unit 123 may output the notification information indicating that the paddle regenerative control is enterable (S619).

With the method described so far of controlling the electrified vehicle, the range of possibilities of entering the paddle regenerative control is expanded on the basis of traffic information and the driver's intention. Thus, the paddle regenerative control has an advantage of being able to be performed without any hardware modification.

The above-described method according to the embodiments of the present invention may be realized by being stored as computer-readable codes on a computer-readable medium. The computer-readable medium includes all types of recording devices in which to store data that is readable by a computer system. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like.

Therefore, the detailed description should not be interpreted in a limited manner in all respects, and should be considered in terms of serving the purpose of illustration. The scope of the present invention is determined by reasonable construction of the following claims. All equivalent modifications to the embodiments of the present invention fall within the scope of the present invention.

What is claimed is:

1. A method of controlling traveling of an electrified vehicle equipped with an electric motor as a power source, the method comprising:
   determining that it is not possible to enter a variable control function, the variable control function comprising a function of variably controlling a coasting torque level using a regenerative braking force;
   in response to the determination that it is not possible to enter the variable control function, determining a cause of an inability to enter the variable control function; and
   performing control in a manner that corresponds to a determination that it is possible to enter the variable control function or the determination of the cause of the inability to enter the variable control function in response to the determination that it is not possible to enter the variable control function,
   wherein:
      the possibility of entering the variable control function is categorized into a plurality of levels based on a driver's intention to enter the variable control function and navigation information, and
      the cause of the inability to enter the variable control function comprises excessive temperature of an electrified power train component or overcharging of a battery.

2. The method of claim 1, wherein the driver's intention to enter the variable control function is determined based on a command that is input for activating the variable control function, and the navigation information is determined based on whether or not a deceleration event occurs a predetermined distance or less away in a forward direction.

3. The method of claim 1, wherein in response to the cause of the inability to enter the variable control function being the excessive temperature of the electrified power train component and the possibility of entering the variable control function being at a first level, performing the control comprises limiting power with which the battery is charged and discharged.

4. The method of claim 1, wherein in response to the cause of the inability to enter the variable control function being the excessive temperature of the electrified power train component and the possibility of entering the variable control function being at a second level higher than a first level, performing the control further comprises limiting regenerative braking by the electric motor.

5. The method of claim 1, wherein in response to the cause of the inability to enter the variable control function being the overcharging of the battery and the possibility of entering the variable control function being at a first level, performing the control comprises controlling to increase the electric motor's share of required torque.

6. The method of claim 1, wherein in response to the cause of the inability to enter the variable control function being the overcharging of the battery and the possibility of entering the variable control function being at a second level that is higher than a first level, performing the control further comprises limiting regenerative braking by the electric motor.

7. The method of claim 1, further comprising:
   addressing the cause of the inability to enter the variable control function; and
   outputting a notification that entering the variable control function is possible through an output unit in response to the cause of the inability to enter the variable control function being addressed.

8. A non-transitory computer-readable recording medium on which a program for performing the method according to claim 1 is recorded.

9. An electrified vehicle comprising:
   an electric motor; and
   a control unit configured to:
      determine whether it is possible to enter a variable control function comprising a function of variably controlling a coasting torque level using a regenerative braking force;
      determine a cause of an inability to enter the variable control function when it is determined it is not possible to enter the variable control function; and
      perform control in a manner that corresponds to a determination that it is possible to enter the variable control function or the determination of the cause of the inability to enter the variable control function where it is not possible to enter the variable control function,
   wherein:
      the possibility of entering the variable control function comprises a plurality of levels categorized by a driver's intention to enter the variable control function and navigation information, and
      the cause of the inability to enter the variable control function comprises excessive temperature of an electrified power train component or overcharging of a battery.

10. The electrified vehicle of claim 9, wherein the driver's intention to enter the variable control function is based on a command input for activating the variable control function, and the navigation information is based on whether or not a deceleration event occurs a predetermined distance or less away in a forward direction.

11. The electrified vehicle of claim 9, wherein in response to the cause of the inability to enter the variable control function being the excessive temperature of the electrified power train component and the possibility of entering the variable control function being at a first level, the control unit is configured to limit power with which the battery is charged and discharged.

12. The electrified vehicle of claim 9, wherein in response to the cause of the inability to enter the variable control function being the excessive temperature of the electrified power train component and the possibility of entering the variable control function being at a second level that is higher than a first level, the control unit is configured to limit regenerative braking by the electric motor.

13. The electrified vehicle of claim 9, wherein in response to the cause of the inability to enter the variable control function being the overcharging of the battery and the possibility of entering the variable control function being at a first level, the control unit is configured to perform control to increase the electric motor's share of required torque.

14. The electrified vehicle of claim 9, wherein in response to the cause of the inability to enter the variable control function being the overcharging of the battery and the possibility of entering the variable control function being at a second level higher than a first level, the control unit is configured to limit regenerative braking by the electric motor.

15. The electrified vehicle of claim 9, wherein the control unit is configured to perform control to output a notification that the variable control function is enterable through an output unit in response to the cause of the inability to enter the variable control function being addressed.

* * * * *